United States Patent Office 2,799,556
Patented July 16, 1957

2,799,556

MANUFACTURE OF AMMONIUM FLUOBORATE

Thomas J. Sullivan, Princeton, Charles H. Milligan, Westfield, and James A. Gross, New Brunswick, N. J., assignors to The American Agricultural Chemical Company, New York, N. Y., a corporation of Delaware No Drawing. Application February 1, 1954,
Serial No. 407,573

8 Claims. (Cl. 23—59)

This invention is concerned with a process for making ammonium fluoborate. Ammonium fluoborate is a known compound which has a number of commercial uses, as for example, for some advantage in making sand molds employed in the casting of magnesium, and for other purposes in various industries.

One process previously known for making ammonium fluoborate has involved ammoniating the pure acid, i. e. fluoboric acid. Since fluoboric acid as most commonly made, by the prior art method using fluorspar and sulfuric acid, has been relatively expensive, the prior process for making ammonium fluoborate was also necessarily expensive. Indeed the necessity of having relatively pure fluoboric acid as a starting ingredient for producing the ammonium salt would be taken as imparting expense to the process in correspondence with the cost of the acid, however made; in contrast, the present invention in its preferred aspects is designed to make use of other materials or of only partly purified acid, with resulting economy both in operation and in cost of reactants used.

The process of this invention has further advantages, beyond its basically economical character as explained above. Thus it is not difficult to carry out since there are no unusual techniques involved. It is readily adaptable to any desired scale of production, for yielding a product having commercially satisfactory purity. In its complete aspect it may be deemed to required only three original ingredients, viz. boric acid, ammonia and fluosilicic acid, which together represent a relative minimum of expense, especially in that fluosilicic acid is available as a by-product (in the past, substantially wasted) in the manufacture of certain agricultural chemicals. In using boric and fluosilicic acids the first stages of the present process may be identical with the first stages of a procedure for making fluoboric acid which is described and claimed in the copending patent application of certain of us (Sullivan, Milligan and Gross) filed November 6, 1953, Serial No. 390,742. Those first stages yield a partly purified fluoboric acid, and from such point the instant process represents special economy (as explained above), in not requiring a fully purified reagent and also in apparently deriving some part of the ultimate fluoborate from other values than completed fluoboric acid, which are then present. The process also gets rid of unwanted material (e. g. silica) by precipitation, and minimizes loss of ammonia.

The process of this invention broadly involves the following steps:

First of all, fluosilicic acid and boric acid are reacted at an elevated temperature. Then, the solution is ammoniated, preferably in two or more stages as explained below, to an alkaline value, i. e. pH 8 to 9 (or alkaline as indicated by phenolphthalein), and finally the solution is evaporated in a manner which appears to cooperate in completing the reactions, for ultimate production of crystals of ammonium fluoborate.

There are several aspects of the particular process which are critical or at least of special importance for attainment of unusually satisfactory results. First of all, in reacting the fluosilicic and boric acids, they must be mixed at a temperature of at least about 70° C. and preferably between 80° C. and 90° C. We have found that if the temperature of the mixture is not maintained high enough, an amorphous product in the form of a gel will be formed instead of a truly solid or granular precipitate of silica ($SiO_2$), and therefore the process would become impractical if not impossible of being carried out. That is to say, the silica must be removed by filtration or equivalent operation, but if it forms in a gelatinous or slimy state, there is no very feasible way of separating it. The temperature can be above 90° C., but desired values in the solution tend to volatilize increasingly at points higher than this temperature level and the losses may therefore tend to become excessive.

Next, the mixing of these two components should be accomplished slowly, the minimum time being usually of the order of one hour for feeding one ingredient into a complete body of the other. More particularly, the mixing should be performed in an even manner and at a slow rate throughout the period involved; too rapid mixing, whether by rapid dumping of the added reactant or otherwise, tends to produce a gel or gelatinous substance instead of a crystalline or granular precipitate of silica, so that, as stated above, the succeeding steps of this process would be rendered extremely difficult if not impossible to accomplish. These requirements or preferred aspects of the first stage of reaction between boric and fluosilicic acids are explained and embraced by the aforesaid copending application.

Another somewhat critical aspect of this process involves the ammoniation of the reactant solution of the fluosilicic acid and boric acid. The ammoniation is or may be carried out hot up to pH 4 or thereabout, and then the solution should preferably be cooled to about 40° C. before ammoniation is continued to reach pH 8 to 9 (e. g. alkalinity to phenolphthalein). The primary reasons for cooling the liquid during the latter stage of ammoniation are: (1) the hot solution would throw off ammonia and cause undesirable losses; (2) under the influence of heat and alkalinity of the ammonia a reaction may occur between ammonia and the ammonium fluoborate already formed (such as Equation 5 below), which causes unnecessary later reaction; and (3) the preferred final end point cannot be reached if the solution is hot, in that the ammonia is then expelled too rapidly and does not react for complete decomposition of the fluosilicate.

With regard to the nature of the reactions in the present process, it may be noted that according to one theory of the chemical mechanisms involved, some boric acid will remain or may perhaps even be formed additionally during the stage of ammoniation at elevated temperature and this boric acid must then be reacted again (e. g. after the ammoniations) with ammonium and fluoride values to form a further quantity of the desired ammonium fluoborate; however, as indicated above, it is desirable to avoid undue formation of boric acid during the completion of ammoniation to alkalinity. The described second or final ammoniation step is of further and special importance for the reason that it is during this step that the remaining silica is precipitated out and further ammonium and fluoride values are apparently made available for useful reaction, e. g. reaction utilizing boric acid which may be unavoidably present.

The final step is important in most cases, and for best results has a somewhat critical aspect in that the evaporation of the solution must be continued until nearly all of the free ammonia has been given off in the vapors, for instance so that the liquid contains substantially no excess ammonia, or conveniently to the point where the vapors contain practically no ammonia.

Although the advantages of the invention are derived from the described procedural operations and can be fully realized without any need for establishing the precise chemical mechanisms and although the invention is therefore not necessarily limited to any specific hypothesis, one theory of the reactions involved in the process is explained by the following series of equations:

The first reaction which takes place upon mixing the fluosilicic acid and the boric acid is as follows (omitting H₂O as the third product of the stated reaction):

(1)
$$2H_2SiF_6 + 3H_3BO_3 \underset{\text{Heat}}{\overset{H_2O}{\rightleftharpoons}} 3HBF_4 + 2SiO_2$$

Then the solution is ammoniated to pH 4.0; the reactions which take place are understood to be the following:

(2)
$$NH_3 + HBF_4 \xrightarrow{H_2O} NH_4BF_4$$

(3)
$$2NH_3 + H_2SiF_6 \xrightarrow{H_2O} (NH_4)_2SiF_6$$

Thereafter the solution is cooled and then ammoniation is continued to pH above 8, e. g. to the point where phenolphthalein turns red. During this stage the following reaction appears to take place:

(4)
$$4NH_3 + (NH_4)_2SiF_6 \xrightarrow{H_2O} 6NH_4F + SiO_2$$

By reason of the reaction mass being cooled, we avoid the following reaction which only takes place hot to any degree, while Reaction 4 does proceed cold:

(5)
$$3NH_3 + NH_4BF_4 \underset{\text{Heat}}{\overset{H_2O}{\longrightarrow}} 4NH_4F + H_3BO_3$$

Finally, during the evaporation, the reactions involved are believed to be as follows:

(6)
$$2NH_4F \underset{\text{Heat}}{\overset{H_2O}{\longrightarrow}} NH_3\nearrow + NH_4HF_2$$

(7)
$$2NH_4HF_2 + H_3BO_3 \underset{\text{Heat}}{\overset{H_2O}{\longrightarrow}} NH_4BF_4 + NH_3\nearrow$$

It will be noted that the product of Reaction 6, ammonium bi-fluoride, reacts with free boric acid (presumably left over from the first step, wherein usually somewhat less than all of the acids have reacted) to produce the desired ammonium fluoborate and free ammonia. Whether the reactions during the evaporation are actually as in Equations 6 and 7 or not, this step appears to be of very considerable value in that upon its termination the boric acid has been substantially consumed and the yield of ammonium fluoborate significantly increased. Indeed tests have shown that this evaporation stage, to the point of effective elimination of ammonia, is usually extremely important for the useful production of the desired product, ammonium fluoborate.

One specific example of a process of making ammonium fluoborate in accordance with the present invention is as follows:

The first step involves mixing a 10% solution of fluosilicic acid with boric acid, e. g. in slight excess, say 2% to 5% above the stoichiometric quantity. This mixing operation is carried out slowly, over a period of one to two hours and with the reactants or at least the receiving reactant at an elevated temperature, so that the temperature for reaction is maintained at about 80° to 90° C. Preferably the mixing is accomplished in one of two ways, viz. (1) by dripping or pouring slowly the fluosilicic acid solution into a hot solution or slurry of boric acid while continuing heating to maintain the indicated temperature; or (2) by slowly adding boric acid, either in solution or slurry, or preferably as boric acid crystals, to a hot 10% solution of fluosilicic acid. At the end of the mixing period, considerable reaction has taken place to yield fluoboric acid, the result thus being, for instance, a mixture of about 85% fluoboric acid and 15% fluosilicic acid with dissolved unreacted boric acid in solution. The mixture thus contains, in addition to the fluoboric acid, additional fluorine, silicon and boron values in a dissolved state. Silica has been precipitated in a granular or like removable condition; while if desired this silica can be separated out by filtration at this point, it is convenient (for economy of operations) to postpone all filtration until a later time, say at the end of the ammoniation stages.

The second step then involves ammoniating the solution resulting from the first step, such solution having an acid concentration (i. e. as the total of fluoboric and fluosilicic, present in the above ratio to each other) of about 10%. Ammoniation here and in the following step is conveniently accomplished by adding ammonia gas or anhydrous liquid ammonia, for instance by bubbling the gas through the solution or mixing the liquid with the solution. The mixture, being hot at the outset, remains, or indeed, if desired, may be kept at an elevated temperature, say about 80° C. Since the reaction or reactions occurring are or tend to be exothermic, the mixture tends to remain hot during this stage. Ammoniation is continued until the reaction mass reaches a pH of about 4.0, for instance until the mass is neutral to an Alizarine red "S" or methyl orange end point. At or about the conclusion of this stage, the solution contains a considerable quantity of ammonium fluoborate, but still with considerable other values as enumerated above, including ammonia, a substantial part of the further values being apparently in the form of ammonium fluosilicate.

The partly ammoniated solution is next cooled to a temperature of about 40° and ammoniated again until a significantly alkaline condition is reached, i.e. about pH 8 to 9, as would represent alkalinity to phenolphthalein. Cooling is continued as necessary during this further ammoniation, to keep the temperature at a suitably low value, e.g. at or below 40° C. During this further ammoniation, especially by reason of the alkalinity of the solution, the fluosilicate is understood to be broken down, presumably yielding ammonium fluoride. Additional silica is precipitated and the mixture is now filtered to remove the silica.

The resulting filtered solution, which presumably contains ammonium fluoborate with additional ammonia, fluoride and boric acid values in solution, is then subjected to the fourth or last step of the complete process, which involves evaporation to remove water. The evaporation (which as explained above, also drives off some ammonia, apparently from desired reaction) can be conveniently effected by simple boiling at atmospheric pressure with externally or otherwise suitably applied heat, by vacuum evaporation (with heat), or in any appropriate way. The evaporation is continued until there is substantially no ammonia being released in the vapors. The further reactions, presumably consuming further boric acid and producing additional ammonia fluoborate are thus effectively completed. The last-mentioned product, as produced by the several steps described, crystallizes out, either by the time the above point is reached in the evaporation, or upon further evaporation if necessary. The crystalline product may then be removed or separated and is found to represent a good commercial grade of ammonium fluoborate, reasonably pure and lacking appreciable contamination of silica, fluoride or other ammonium compounds. That is to say, the ultimate dry crystalline ammonium fluoborate has good purity, for general purposes. Analysis of a typical product of the process, in percentages by weight, is given by the following table:

| Component | Theory | Product |
|---|---|---|
| NH₃ | 16.2 | 16.17 |
| B | 10.3 | 10.50 |
| F | 72.4 | 71.84 |

It will be understood that a considerable variation in proportions and operations of the process is permissible without departing from the basic principles involved. For example, in the first step the fluosilicic acid may be less or more concentrated than 10%, e.g. having an acid content even up to 20% or so. The temperature of the first step should be at least about 70° C. and may be even higher than 90° C., although as explained, there may be excessive loss by decomposition and volatilization at very high temperatures. As also stated, the performance of the first reaction in the heated state of the mass is important to yield a precipitate of silica in granular or other easily removable form, as distinguished from a gelatinous or other unsuitable substance which appears when the reactants are mixed at a low temperature or are mixed too rapidly. Ordinarily, the mixing period should be at least about one hour, there being no critical limit as to much longer periods, except for economy of time. It is preferably, although not critically necessary, to employ some excess of boric acid, a slight excess being usually sufficient although a relatively large excess may sometimes be employed. As also stated, this step is mainly identical with the corresponding step in the process of manufacturing fluosilicic acid as disclosed in the above cited copending application, Serial No. 390,742.

The ammoniation stages, as explained, are conveniently performed with ammonia gas or anhydrous liquid ammonia, although ammonia in water solution (e.g. as concentrated ammonium hydroxide) may alternatively be used in some cases, if provision is made (as also in the use of anhydrous liquid ammonia) to introduce such solution in a way to avoid excess release of ammonia gas during the second or equivalent step when the reaction mixture is hot.

It will be understood that the ammoniations, preferably performed as two successive steps, may, if desired, be carried out as several steps, e.g. reaching progressively higher pH values and performed at progressively lower temperatures. Alternatively, the ammoniation may be effected continuously as a single long step; to avoid greatly undue losses by allowing a rather high temperature throughout the step or to avoid excessive length of time by maintaining a low temperature throughout, such continuous ammoniation can effectively be performed by gradually reducing the temperature, for example until at the end it is about 40° or below and the pH has become alkaline as indicated above.

Where the preferred two-stage method of ammoniation is utilized, the precise values of pH 4.0 at the end of the first stage and of a temperature of 40° for performance of the second stage, are not in themselves highly critical; however, the hot ammoniation should very preferably be interrupted well before the normal point of neutrality is reached, and the second ammoniation step should be carried out at a temperature low enough to avoid undue ammonia loss, e.g. a temperature very substantially below the operating point of the first ammoniation. The second or end phase of the ammoniation should thus be performed cold, as the tendency of the ammonia to leave the hot solution defeats the reaction of ammonia to precipitate silica from the fluosilicate. That is to say, the temperature may be somewhat above 40° C., but the higher it is the greater is the loss of ammonia, and the less effective the reaction with fluosilicate, and also the greater the possibility of undesired reaction as explained above. The preferred practice is to maintain the mass at as cool a temperature as practicable, with the understood purposes of effectuating Reaction 4 and avoiding reaction such as set forth at (5) above. The end point is conveniently indicated by just reaching alkalinity to phenolphthalein. Ammoniation to a greater alkalinity is not critically objectionable, although longer or more effective evaporation will then be required, to get rid of the excess ammonia.

Describing certain aspects of the process in a generic sense, it will be seen that either by gradual or marked change or changes the effective sequence is that the ammonia treatment is effected in two stages, the temperature of the solution being permitted to remain elevated during the first stage, said first stage being interrupted while the pH of the solution remains substantially below 7, the solution being cooled to a temperature below 50° C. before and during the second stage, and the second stage being continued to effectuate precipitation of silicon values as silica.

The filtration following the final ammoniation stage is a preferred feature of special significance, particularly in that the ammonium fluoborate product may thereafter be separated by crystallization, without contamination by the precipitated silica. Furthermore if silica remained, there may be objectionable reaction of silica with fluorine values during the final evaporation stage. The last-mentioned stage is conveniently effected by vacuum evaporation with suitable heating, or by any other appropriate evaporation method. As explained, best attainment of the desired product is achieved by continuing the evaporation until essentially all excess ammonia has been driven off. The reaction is thus forced to completion, for maximum yield of ammonium fluoborate.

A particularly important step is the second ammoniation stage or its equivalent, whereby the remaining silica is precipitated, and thereafter removed by filtration (to avoid contamination of the ultimate product as well as loss of fluorine value in subsequent reaction), and also to provide further combination of ammonia. That is to say, continuation of ammoniation at high temperature, e. g. from substantially above pH 4.0 or so, becomes uneconomical in that there is excessive volatilization of ammonia, much of the latter in effect then simply passing through the mass without reaction.

It will be clear to one skilled in the art that the ammonia being given off during the evaporation step of the process, can be recovered from the vapors as can also any ammonia that is given off during the ammoniation steps. Since such recovery forms no part of the present invention, it will not be further discussed here.

We have described our process in detail in accordance with the applicable statutes, but this is to be taken in a descriptive sense only and in no way as limiting our invention.

We claim:

1. In procedure for manufacturing ammonium fluoborate from weak fluosilicic acid solutions that consist of aqueous solution of fluosilicic acid in concentrations up to 20%, the steps of: mixing boric acid with the fluosilicic acid solution slowly at a temperature of at least about 70° C. to produce a solution containing fluoboric acid and precipitated silica in separable form and also containing unreacted fluosilicic and boric acids, treating the solution with ammonia, whereby the pH of the solution is progressively raised, a first portion of said ammonia treatment being performed while the solution remains at an elevated temperature of at least about 70° C., cooling the solution to a temperature less than about 50° C. after the ammonia treatment has brought the solution to a pH of about 4 and while the solution remains at a pH substantially below neutrality, and continuing the ammonia treatment of the solution while preventing rise of temperature of the solution and until the solution reaches a pH of at least about 8, to effectuate further precipitation of silica while inhibiting loss of ammonia.

2. In procedure for manufacturing ammonium fluoborate from weak fluosilicic acid solutions that consist of aqueous solution of fluosilicic acid in concentrations up to 20%, the steps of: mixing boric acid with the fluosilicic acid solution slowly at a temperature at least about 70° C. to produce a solution containing fluoboric acid and precipitated silica in separable form and also containing unreacted fluosilicic and boric acids, and thereafter treating the solution to derive ammonium fluoborate from said fluoboric acid and also from said unreacted acids, said treatment comprising treating the solution with ammonia, whereby the pH of the solution is progressively raised, a first portion of said ammonia treatment being performed while the solution remains at an elevated temperature of at least about 70° C., cooling the solution to a temperature less than about 50° C. after the ammonia treatment has brought the solution to a pH of about 4 and while the solution remains at a pH substantially below neutrality, continuing the ammonia treatment of the solution until the solution reaches a pH of at least about 8, while preventing rise of temperature of the solution, to impede loss of ammonia while further precipitation of silica is effectuated, separating precipitated silica from the solution, and subjecting the solution to evaporation to complete the production of substantially pure ammonium fluoborate.

3. In procedure for manufacturing ammonium fluoborate from weak fluosilicic acid solutions that consist of aqueous solution of fluosilicic acid in concentrations up to 20%, the steps of: mixing boric acid with the fluosilicic acid solution slowly at a temperature of at least about 70° C. to produce a solution containing fluoboric acid and precipitated silica in separable form and also containing unreacted fluosilicic and boric acids, treating the solution with ammonia, whereby the pH of the solution is progressively raised, said ammonia treatment being initiated with the solution at the elevated temperature of said first step and a first portion of said ammonia treatment being performed with the solution at such elevated temperature, cooling the solution to a temperature less than about 50° C. when the ammonia treatment has brought the solution to a pH of about 4, and continuing the ammonia treatment of the cooled solution to reach a pH of at least about 8, at least a final portion of said continued ammonia treatment being performed while maintaining the solution at a temperature not higher than about 40° C., to effectuate further precipitation of silica while inhibiting loss of ammonia.

4. Procedure as defined in claim 3, wherein the solution under treatment by ammonia is reduced by cooling to a temperature not higher than about 40° C. when the ammonia treatment has brought the solution to a pH of about 4, and wherein the last ammonia treatment is followed by the steps of separating precipitated silica from the solution and thereafter completing the production of substantially pure ammonium fluoborate by evaporating the solution with application of heat, until the departing vapors are substantially free of ammonia.

5. In a process for producing ammonium fluoborate, the steps of: treating a fluoboric acid solution which also contains fluosilicic and boric acids, with ammonia, whereby the pH of the solution is progressively raised, a first portion of said ammonia treatment being performed with the solution at an elevated temperature of at least about 70° C., cooling the solution to a temperature less than about 50° C. after the ammonia treatment has brought the solution to a pH of about 4 and while the solution remains at a pH substantially below neutrality, and continuing the ammonia treatment of the solution while preventing rise of temperature of the solution and until the solution reaches a pH of at least about 8, to effectuate precipitation of silica while inhibiting loss of ammonia.

6. Procedure as defined in claim 5, which includes the further steps of separating silica from the solution after the last ammonia treatment, and thereafter subjecting the solution to evaporation with heat to complete the production of substantially pure ammonium fluoborate.

7. Procedure as defined in claim 6, in which after the first portion of the ammonia treatment, the solution is cooled to a temperature not higher than about 40° C. when the solution has reached a pH of about 4.

8. In a process for producing ammonium fluoborate, the steps of: establishing a fluoboric acid solution which also contains fluosilicic and boric acids and in which the amount of fluoboric acid is not more than about 85% of the total of fluoboric and fluosilicic acids, treating said solution with ammonia, whereby the pH of the solution is progressively raised, a first portion of said ammonia treatment being performed with the solution at an elevated temperature of at least about 70° C., cooling the solution to a temperature not higher than about 40° C. after the ammonia treatment has brought the solution to a pH of about 4 and while the solution remains at a pH substantially below neutrality, continuing the ammonia treatment of the solution while preventing rise of temperature of the solution and until the solution reaches a pH of at least about 8, to effectuate precipitation of silica while inhibiting loss of ammonia, thereafter separating silica from the solution and subjecting the solution to evaporation, to produce substantially pure ammonium fluoborate.

References Cited in the file of this patent
UNITED STATES PATENTS
2,692,186    Kamlet _____ Oct. 19, 1954

OTHER REFERENCES

J. W. Mellor's "A Comprehensive Treatise on Inorganic and Theoretical Chem.," vol. 5, 1924 Ed., pages 123 and 127. Longmans, Green and Co., N. Y.